US005715128A

United States Patent [19]
Uchikawa

[11] Patent Number: 5,715,128
[45] Date of Patent: Feb. 3, 1998

[54] POWER SUPPLY PROTECTION CIRCUIT CAPABLE OF PREVENTING A FAILURE IN A MOBILE SATELLITE COMMUNICATION APPARATUS RESULTING FROM ERRONEOUS CONNECTION

[75] Inventor: Setomi Uchikawa, Tokyo, Japan

[73] Assignee: NEC Corporation, Tokyo, Japan

[21] Appl. No.: 756,707

[22] Filed: Nov. 26, 1996

Related U.S. Application Data

[63] Continuation of Ser. No. 452,683, May 30, 1995, abandoned.

[30] Foreign Application Priority Data

May 30, 1994 [JP] Japan ................. 6-116163

[51] Int. Cl.⁶ ........................................ H02H 3/18
[52] U.S. Cl. ..................................... 361/84; 361/86
[58] Field of Search ........................ 361/78, 84, 86, 361/119; 320/26

[56] References Cited

U.S. PATENT DOCUMENTS

| | | |
|---|---|---|
| 4,027,223 | 5/1977 | Renz ................. 320/26 |
| 5,075,813 | 12/1991 | Takabayashi ........... 361/84 |

FOREIGN PATENT DOCUMENTS

U9208390  10/1992  Germany .

OTHER PUBLICATIONS

N. Kannan, "Relay guarantees polarity protection," EDN Electrical Design News 36 (1991) Apr. 25, No. 9, p. 188.

"DC polarity protection," Elector, Jan. 1979, vol. 5, No. 1, p. 19.

*Primary Examiner*—Fritz Fleming
*Assistant Examiner*—Sally C. Medley
*Attorney, Agent, or Firm*—Sughrue, Mion, Zinn, Macpeak & Seas, PLLC

[57] ABSTRACT

A power supply protection circuit is provided for use in a mobile satellite communication apparatus which is connected to an external power supply for driving a load circuit therein. The power supply protection circuit includes first and second relay switches which electrically connect a power supply line and common ground line, respectively, to the load circuit when the power supply is normally connected in polarity and which interrupt the power supply and common ground lines leading to the load circuit when the power supply is erroneously connected in polarity. The first and the second relay switches are controlled by a diode to be closed when the power supply is normally connected to the load circuit and to be opened when the power supply is erroneously connected to the load circuit. A resistor supplies a current level adapted to operate the first and the second relay switches and the diode.

4 Claims, 4 Drawing Sheets

POWER SUPPLY PROTECTION CIRCUIT CAPABLE OF PREVENTING A FAILURE IN A MOBILE SATELLITE COMMUNICATION APPARATUS RESULTING FROM ERRONEOUS CONNECTION

This is a Continuation of application Ser. No. 08/452,683 filed May 30, 1995 now abandoned.

BACKGROUND OF THE INVENTION

This invention relates to a power supply protection circuit and, in particular, to a power supply protection circuit of a mobile satellite communication apparatus mounted on a mobile body such as an automobile.

In a mobile satellite communication apparatus, a power supply is connected to a load circuit through a power supply protection circuit.

A conventional power supply protection circuit of the type described comprises positive and negative terminals to which an external power supply is connected, a relay switch and contacts both of which are connected in series to each other between the positive and the negative terminals, a diode, and a resistor which are connected in parallel to the contact.

In the conventional power supply protection circuit, the diode is applied with a forward bias when the external power supply is normally connected to the load circuit. In this event, a current flows from the positive terminal to the negative terminal. The relay switch is excited to close the contact. In such normal connection, the resistor allows a very weak current to flow to the relay switch and holds this state. Accordingly, a voltage of the external power supply is substantially directly supplied to the load circuit.

On the other hand, when the external power supply is reversely connected to the positive terminal and the negative terminal of the power supply protection circuit, the diode is applied with a reverse bias so that no more than a reverse current of an extremely low level is allowed to flow. Therefore, the relay switch is not excited and the contact is opened. As a consequence, a reverse voltage is not supplied to the load circuit.

A mobile satellite communication apparatus can be mounted on an automobile, a train, or the like. When the mobile satellite communication apparatus is mounted on an automobile, a train, or the like, as described above, a case of the apparatus is fastened through screw engagements to a body of the automobile, the train, or the like on which the apparatus is mounted. Such screw engagements provide a ground for the mobile satellite communication apparatus.

Notably, when the mobile satellite communication apparatus is used as a terminal equipment for general users, frequently an external power supply is abnormally connected to the positive and negative terminals of the power supply protection circuit in the mobile satellite communication apparatus.

Under the circumstances, in the mobile satellite communication apparatus, the conventional power supply protection circuit cannot fully effectively accomplish power supply protection in the mobile satellite communication apparatus.

SUMMARY OF THE INVENTION

It is therefore an object of this invention to provide a power supply protection circuit effectively operable in a mobile satellite communication apparatus mounted in an automobile, a train, or the like.

Other objects of this invention will become clear as the description proceeds.

According to an aspect of this invention, there is provided a power supply protection circuit comprising first and second relay switches for electrically connecting a power supply line and a common ground line, respectively, to a load circuit when a primary power supply is normally connected in polarity and for interrupting the power supply and common ground lines leading to the load circuit when the primary power supply is erroneously connected in polarity, and a diode for controlling the first and the second switches to be closed when the power supply is normally connected to the load circuit and to be open when the power supply is erroneously connected to the load circuit.

The power supply protection circuit may further comprise a resistor for supplying a current level adapted to operate the first and the second relay switches and the diode.

Specifically, the power supply protection circuit according to this invention comprises the diode subjected to the reverse bias when the power supply is reversely connected, and the relay switches each of which has a contact brought into an opened state when no current flows through a coil due to presence of the reverse bias. Alternatively, the power supply protection circuit further comprises the resistor for adjusting an operating current for the diode and the relay switches.

According to another aspect of this invention, there is provided a power supply protection circuit for use in a mobile satellite communication apparatus which is connected to an external power supply for driving a load circuit therein through a power supply and a ground lines, comprising: power supply and ground terminals to which said external power supply is connected; first and second relay switches for electrically connecting said power supply line to said load circuit when said power supply is normally connected in polarity and for interrupting said power supply line leading to said load circuit when said power supply is erroneously connected in polarity; a diode for controlling said first and second relay switches; a resistor for supplying a current level adapted to operate said first and said second relay switches and said diode; and a power supply section which is connected to said external power supply at said power supply and said ground terminals. With the above-mentioned circuit structures, the power supply and the mobile satellite communication apparatus are disconnected from each other to interrupt power supply.

DESCRIPTION OF THE PREFERRED EMBODIMENTS

Figure 1:
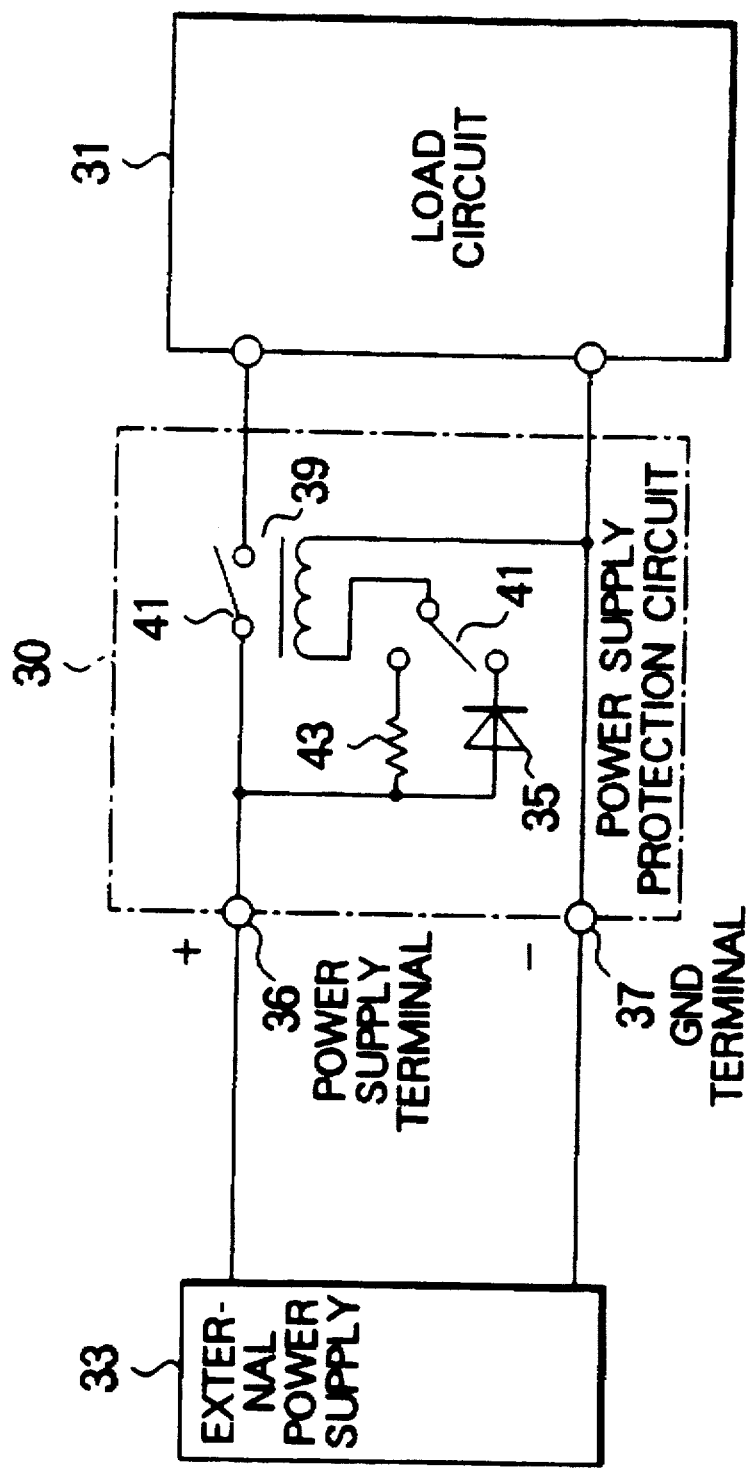
FIG. 1 is a block diagram of a conventioal power supply protection circuit.

Referring to FIG. 1, description is, at first, made about a conventional power supply protection circuit for a better understanding of this invention.

As illustrated in FIG. 1, the conventional power supply protection circuit 30 comprises positive and negative terminals 36 and 37 to which an external power supply 33 is connected, a relay switch 39 and contacts 41 which are connected in series to each other between the positive and the negative terminals 36 and 37, a diode 35 and a resistor 43 which are connected in parallel to the contact 41.

In the conventional power supply protection circuit 30, the diode 35 is applied with a forward bias when the external power supply 33 is normally connected to the load circuit 31. In this event, a current flows from the positive terminal 36 to the negative terminal 37. The relay switch 39 is excited to close the contact 41. In such normal connection, the resistor 43 allows a very weak current to flow to the relay switch 39 and holds this state. Accordingly, a voltage of the external power supply 33 is substantially directly supplied to the load circuit 31.

On the other hand, when the external power supply 33 is reversely connected to the positive terminal 36 and the negative terminal 37 of the power supply protection circuit 30, the diode 35 is applied with a reverse bias so that no more than a reverse current of an extremely low level is allowed to flow. Therefore, the relay switch 39 is not excited and the contact 41 is opened. As a consequence, a reverse voltage is not supplied to the load circuit 31.

A mobile satellite communication apparatus can be mounted on an automobile, a train, or the like. When the mobile satellite communication apparatus is mounted on an automobile, a train, or the like as described above, a case of the apparatus is fastened through screw engagements to a body of the automobile, the train, or the like on which the apparatus is mounted. Such screw engagements provide a ground for the mobile satellite communication apparatus.

Figure 2A:
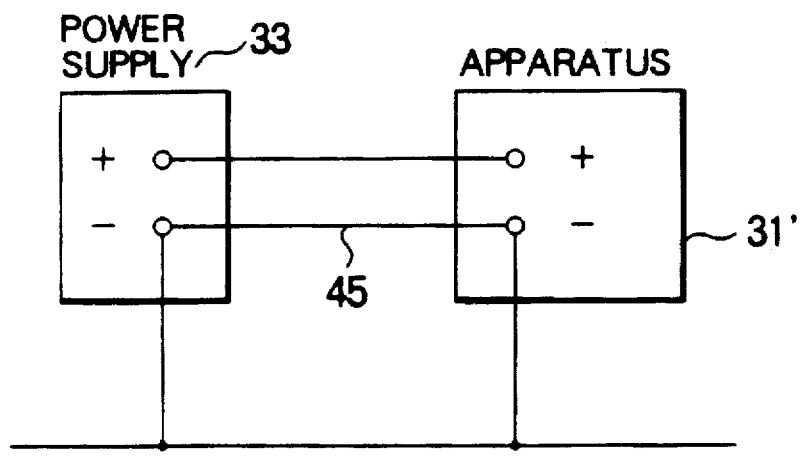
FIG. 2A is a power supply system diagram of a car equipped with a mobile satellite communication apparatus having the power supply protection circuit illustrated in FIG. 1 in case where a power supply of the mobile satellite communication apparatus is normally connected.

If the mobile satellite communication apparatus is fastened through screw engagements as described above, when the external power supply 33 is normally connected, as illustrated in FIG. 2A, a negative terminal of the external power supply 33 and a negative input terminal of the mobile satellite communication apparatus are connected to each other not only through a power supply cable 45 but are also connected to the body of the vehicle to which the case is attached so as to be grounded, as illustrated in FIG. 2A.

Figure 2B:
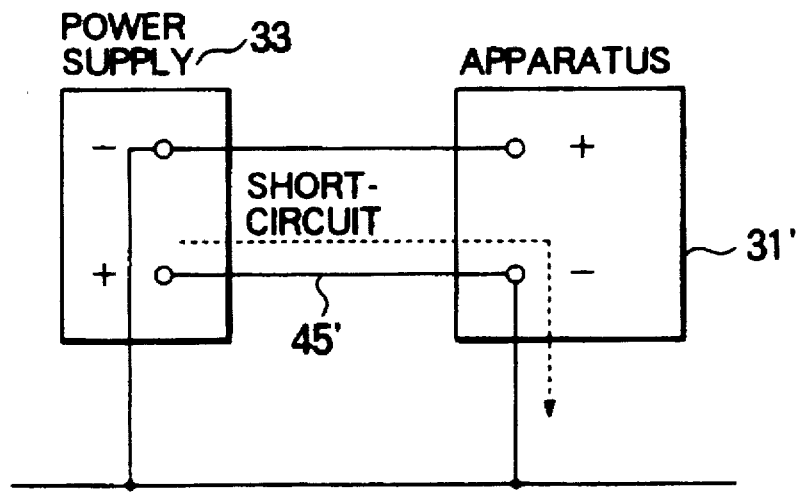
FIG. 2B is a power supply system diagram of the car equipped with the mobile satellite communication apparatus having the power supply protection circuit illustrated in FIG. 1 in case where the power supply of the mobile satellite communication apparatus is reversely connected.

On the other hand, it is assumed that the external power supply 33 may be reversely connected with respect to the power supply terminal of the mobile satellite communication apparatus, as illustrated in FIG. 2B. In this event, a positive terminal of the external power supply 33 and the negative input terminal of the mobile satellite communication apparatus are connected to each other through a power supply cable 45' while the external power supply 33 and the mobile satellite communication apparatus are kept grounded. This brings about occurrence of substantial short circuit.

The conventional power supply protection circuit 30 is based on one-to-one connection to the positive and the negative terminals of the external power supply 33. Power supply protection is achieved by putting a positive side of the load circuit 31 alone into an opened state, in other words, by opening the contact 41 as illustrated in FIG. 1. However, the power supply cable 45', namely, a negative side of the mobile satellite communication apparatus 31' (load circuit) brings about short circuit as described above. Under the circumstances, in the mobile satellite communication apparatus mounted an automobile, train, or the like, the conventional power supply protection circuit 30 can not fully effectively accomplish power supply protection in the mobile satellite communication apparatus.

Figure 3:
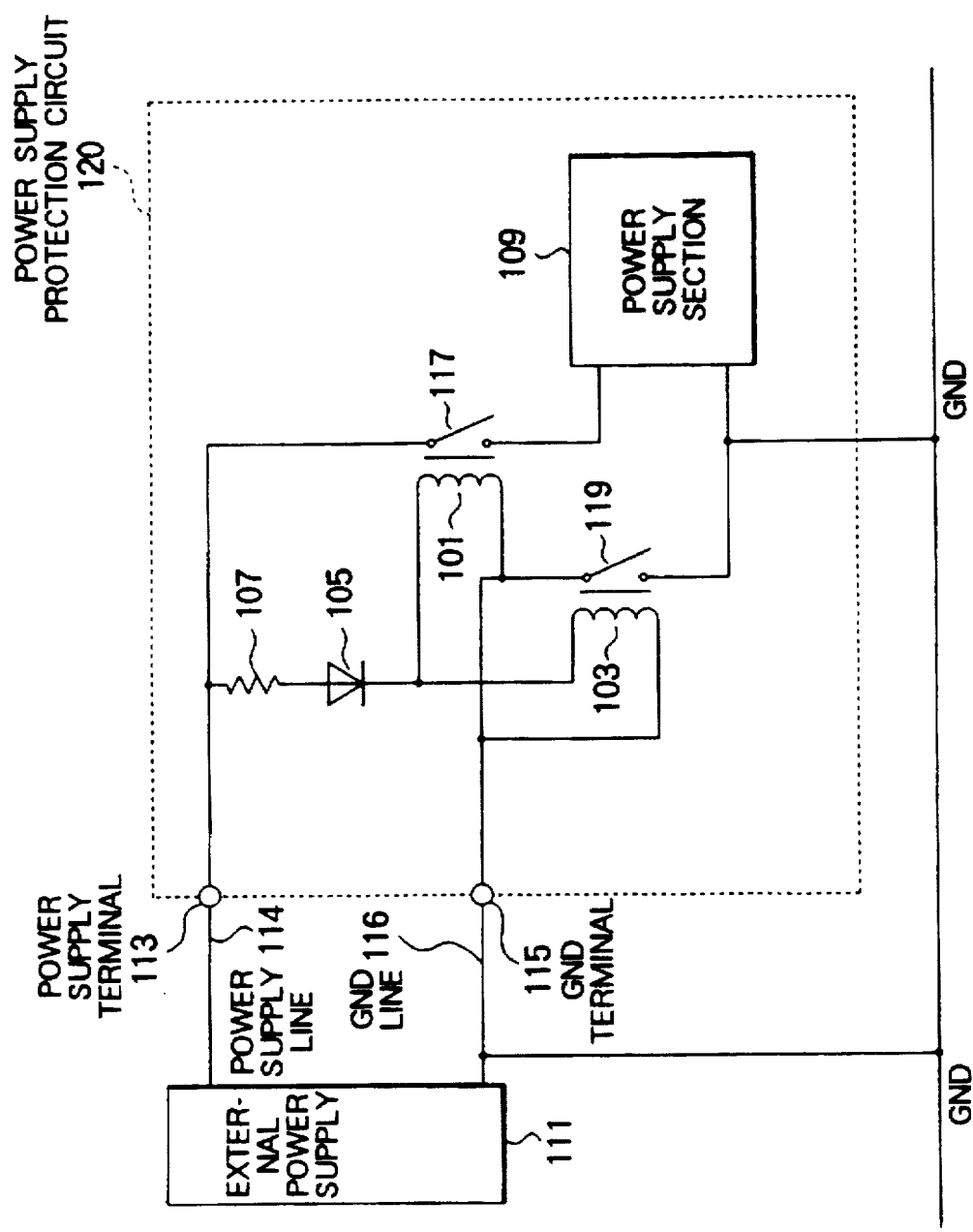
FIG. 3 is a block diagram of a power supply protection circuit according to an embodiment of this invention.

Referring to FIG. 3, description will proceed to a power supply protection circuit according to a preferred embodiment of this invention.

As illustrated in FIG. 3, the power supply protection circuit according to this embodiment comprises first and second relay switches 101 and 103 for electrically connecting a power supply line 114 to a load circuit 31 (shown in FIG. 1) when a primary power supply is normally connected in polarity and for interrupting the power supply line 114 leading to the load circuit 31 when the primary power supply is erroneously connected in polarity, a diode 105 for controlling the first and the second relay switches 101 and 103, and a resistor 107 for supplying a current level adapted to operate the first and the second relay switches 101 and 103 and the diode 105.

Now, operation of the power supply protection circuit according to this embodiment will be described.

When a power supply section 109 of a mobile satellite communication apparatus is normally connected to an external power supply 111 at a power supply terminal 113 and a ground terminal 115, a potential difference between the power supply line 113 and the ground terminal 115 causes a forward current to flow through the diode 105 and through the first and the second relay switches 101 and 103. The first and the second relay switches 101 and 103 are excited by the forward current from the diode 105 to close the contacts 117 and 119, respectively. Thus, the power supply line 114 and the ground line 116 are electrically connected to the power supply section 109.

If the forward current flows excessively against internal resistances of the first and the second relay switches 101 and 103 and the diode 105, the resistor 107 may be inserted in cascade.

On the other hand, when the power supply line 114 and the ground line 116 are reversely connected to the ground of the external power supply 111 and the power supply terminal of the external power supply 111, respectively, a potential difference is also produced between the power supply line 114 and the ground line 116. In the power supply protection circuit according to this embodiment, the diode 105 allows no more than an extremely low level of a reverse current to flow. Therefore, the first and the second relay switches 101 and 103 are not activated and the contacts 117 and 119 are left opened. Accordingly, the power supply line 114 and the ground line 116 are isolated from the power supply section 109 by the first and the second relay switches 101 and 103. As a consequence, the power supply section 109 is disconnected from the external power supply 111. Thus, the power supply section 109 is subjected to no reverse voltage and occurrence of short circuit is avoided.

As described above, according to the first embodiment of this invention, it is possible to effectively prevent a failure in the mobile satellite communication apparatus resulting from erroneous connection to the power supply input terminal and the ground of the mobile satellite communication apparatus.

Figure 4:
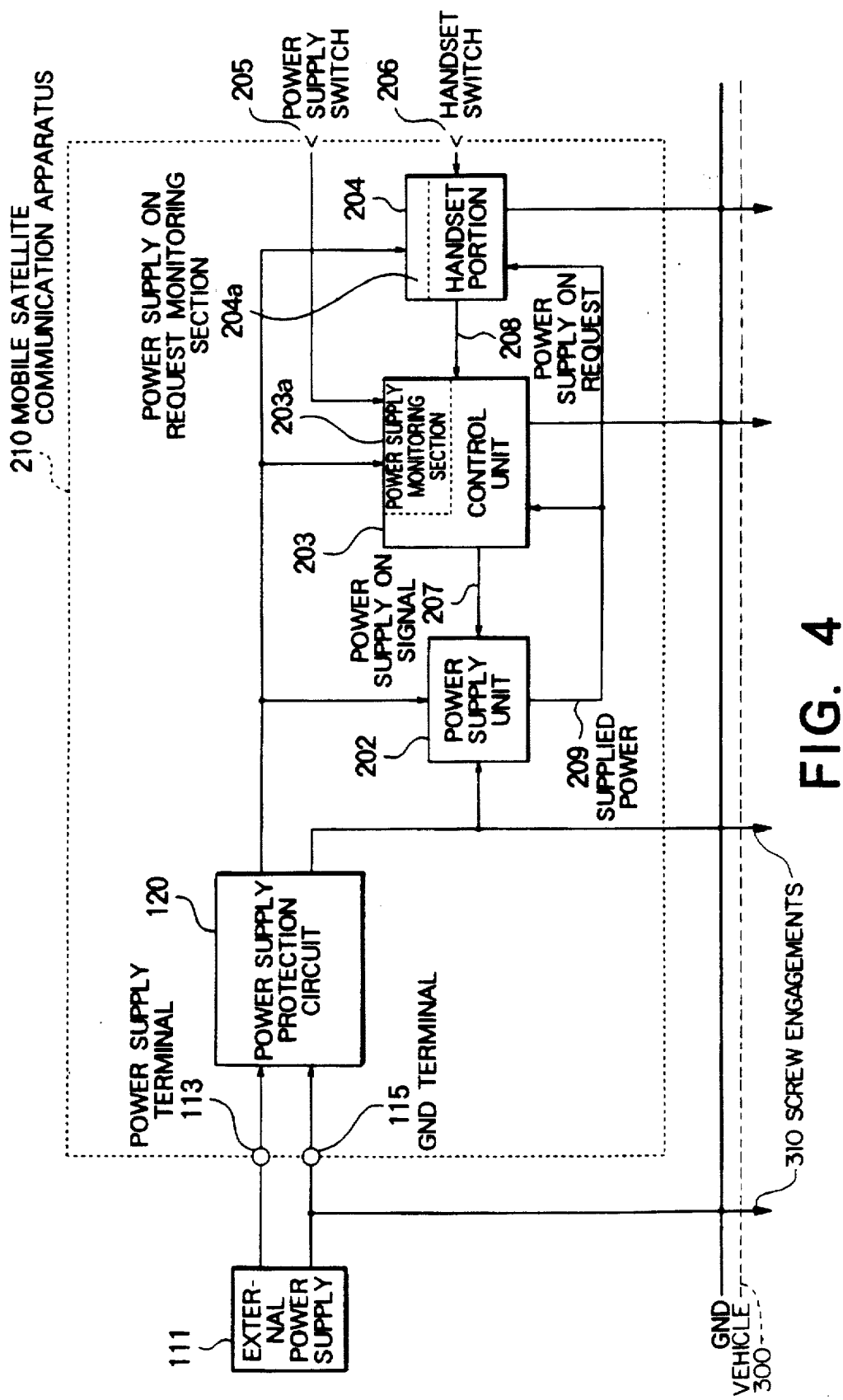
FIG. 4 is a block diagram of a mobile satellite communication apparatus having a power supply protection circuit illustrated in FIG. 3.

Referring in turn to FIG. 4, description will proceed to a mobile satellite communication apparatus 210 which has a power supply protection circuit 120 illustrated in FIG. 3.

As illustrated in FIG. 4, the mobile satellite communication apparatus 210 comprises the power supply protection circuit 120 which includes the power supply terminal 113 and the ground terminal 115. The mobile satellite communication apparatus 210 further comprises a power supply unit 202, a control unit 203 which includes a power supply monitoring section 203a, a handset portion 204, a power supply switch 205, and a handset switch 206.

In FIG. 4, when the external power supply 111 is normally connected to the power supply terminal 113 and the ground terminal 115, the power supply terminal 113 comes to be connected to the power supply unit 202, the control unit 203 and the handset portion 204 in the mobile satellite communication apparatus 210. In the control unit 203, only the power supply monitoring section 203a becomes operable by power supply from the power supply terminal 113. Similarly, in the handset portion 204, only the power supply on request monitoring section 204a operates by the power supply from the power supply terminal 113. Under the conditions, when a power supply on request by the power supply switch 205 or a power supply on request 208 from the handset portion 204 by the handset switch 206 is detected by the power supply monitoring section 203a, the control unit 203 produces a power supply on signal 207 to the power supply unit 202. In response to the power supply on signal 207, the power supply unit 202 produces a supplied power 209 towards each portion in the mobile satellite communication apparatus 210. Thus, when the external power supply 111 is normally connected to the power supply terminal 113 and the ground terminal 115, a current flows from the power supply terminal 113 to the ground terminal 115 and so electric power is supplied to each portion, namely, the power supply unit 202, the control unit 203 and the handset portion 204 in the mobile satellite communication apparatus 210. On the contrary, when the external power supply 111 is reversely connected to the power supply terminal 113 and the ground terminal 115, each portion, that is, the power supply unit 202, the control unit 203 and the handset portion 204 remain grounded and become completely separated from the external power supply 111 by the above mentioned power supply protection operation of the power supply protection circuit 120.

Accordingly, even though the above described failure in the mobile satellite communication apparatus 210 resulting from the erroneous connection cannot be prevented, main portions, that is, the power supply unit 202, the control unit 203 and the handset portion 204 do not suffer from an influence of the erroneous connection. Furthermore, the power supply protection circuit of the mobile satellite communication apparatus can be realized with a simple structure. Thus, in view of reduction in size of the mobile satellite communication apparatus, a greatly advantageous effect is obtained by the first embodiment of this invention. The mobile satellite communication apparatus 210 and the external power supply 111 are also connected to a vehicle 300 via screw engagements 310.

While this invention has thus far been described in specific conjunction with a preferred embodiment thereof, it will now be readily possible for one skilled in the art to put this invention into effect in various other manners. For example, in the above described embodiment, the power supply projection circuit 120 is for use in the mobile satellite communication apparatus 210. However, the power supply protection circuit of this invention may be applied to various other communication apparatus.

What is claimed is:

1. A power supply protection circuit for use in a mobile satellite communication apparatus which is connected to an external power supply for driving a load circuit therein through a power supply line and a common ground line, said power supply protection circuit comprising first and second relay switches for electrically connecting said power supply line and said common ground line, respectively, to a load circuit while a primary power supply is normally connected in polarity and for interrupting said power supply and common ground lines leading to said load circuit while said power supply is erroneously connected in polarity, and a diode for controlling said first and said second switches to be closed while said power supply is normally connected to the load circuit and to be open when said power supply is erroneously connected to the load circuit;

wherein said mobile satellite communication apparatus and external power supply are mounted on a vehicle using screw engagements which provide a common grounding for said mobile satellite communication apparatus and external power supply and said power supply protection circuit is connected by one of said screw engagements to said vehicle, said one of said screw engagements providing common grounding of said power supply protection circuit.

2. A power supply protection circuit as claimed in claim 1, further comprising a resistor for supplying a current level adapted to operate said first and said second relay switches and said diode.

3. A power supply protection circuit for use in a mobile satellite communication apparatus which is connected to an external power supply for driving a load circuit therein through a power supply line and a common ground line, said power supply protection circuit comprising:

first and second relay switches for electrically connecting said power supply line and said common ground line to a load circuit while said power supply is normally connected in polarity and for interrupting said power supply and said common ground lines leading to said load circuit while said power supply is erroneously connected in polarity;

a diode for controlling said first and said second relay switches to be closed while said power supply is normally connected to the load circuit and to be open while said power supply is erroneously connected to the load circuit; and a resistor for supplying a current level adapted to operate said first and said second relay switches and said diode;

wherein said mobile satellite communication apparatus and external power supply are mounted on a vehicle using screw engagements which provide a common grounding for said mobile satellite communication apparatus and external power supply and said power supply protection circuit is connected by one of said screw engagements to said vehicle, said one of said screw engagements providing common grounding of said power supply protection circuit.

4. A power supply protection circuit for use in a mobile satellite communication apparatus which is connected to an external power supply for driving a load circuit therein through a power supply line and a common ground line, said power supply protection circuit comprising:

power supply and ground terminals to which said external power supply is connected;

first and second relay switches for electrically connecting said power supply and common ground lines, respectively, to said load circuit while said power supply is normally connected in polarity and for interrupting said power supply and common ground lines leading to said load circuit while said power supply is erroneously connected in polarity;

a diode for controlling said first and said second relay switches;

a resistor for supplying a current level adapted to operate said first and said second relay switches and said diode; and a power supply section which is connected to said external power supply at said power supply and said ground terminals;

wherein said mobile satellite communication apparatus and external power supply are mounted on a vehicle using screw engagements which provide a common grounding for said mobile satellite communication apparatus and external power supply and said power supply protection circuit is connected by one of said screw engagements to said vehicle, said one of said screw engagements providing common grounding of said power supply protection circuit.

* * * * *